United States Patent [19]

Peshina et al.

[11] 3,745,297
[45] July 10, 1973

[54] APPARATUS FOR MAKING A CAGE ASSEMBLY

[75] Inventors: William J. Peshina; William F. Peshina, both of North Royalton; Roger F. Stevers, Cleveland, all of Ohio

[73] Assignee: Royal Wire Products Inc., North Royalton, Ohio

[22] Filed: June 28, 1972

[21] Appl. No.: 266,978

[52] U.S. Cl. ............ 219/56, 140/112, 219/87, 219/160
[51] Int. Cl. ............................................. B23k 11/10
[58] Field of Search ........... 219/56, 58, 87, 158, 219/160, 117 HD; 140/112; 29/163.5

[56] References Cited
UNITED STATES PATENTS

| | | | |
|---|---|---|---|
| 1,895,577 | 1/1933 | Little | 219/56 |
| 3,597,568 | 8/1971 | Rach | 219/56 |
| 2,473,859 | 6/1949 | Butler | 219/56 |
| 2,448,941 | 9/1948 | Wickwire | 240/112 |
| 3,579,259 | 5/1971 | Kato | 219/56 |
| 1,878,760 | 9/1932 | Cosgrove et al. | 219/56 |

*Primary Examiner*—J. V. Truhe
*Assistant Examiner*—B. A. Reynolds
*Attorney*—Donnelly, Maky, Renner & Otto

[57] ABSTRACT

An apparatus is provided for making a cage assembly having interconnected linear and endless wires. Such apparatus includes a cylindrical array of guide tubes containing the linear wires, with such wires being exposed at one end of such tubes; a support assembly for maintaining one of the endless wires in proper position relative to the exposed portion of the linear wires; a plurality of radially movable inner and outer welding electrodes adapted to spot weld the endless wire to the linear wires; and an indexing piston-cylinder assembly adapted uniformly to advance the welded linear and endless wires for subsequent spot welding of another endless wire. The inner electrodes are superimposed upon electrode holders adapted radially to be moved by an arbor cam reciprocated by a control piston-cylinder assembly, such control piston-cylinder assembly being axially aligned with and reciprocated by the indexing piston-cylinder assembly.

15 Claims, 7 Drawing Figures

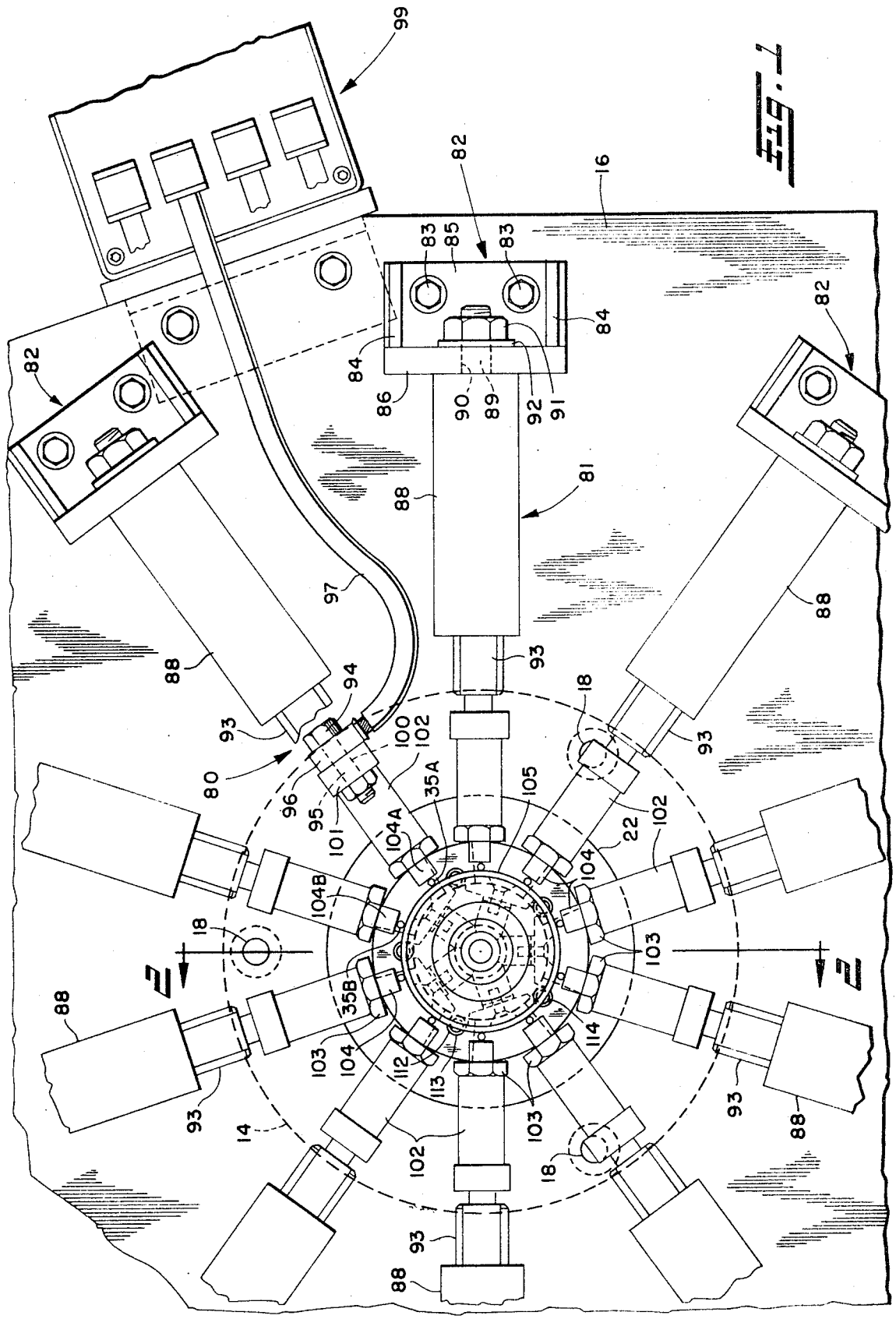

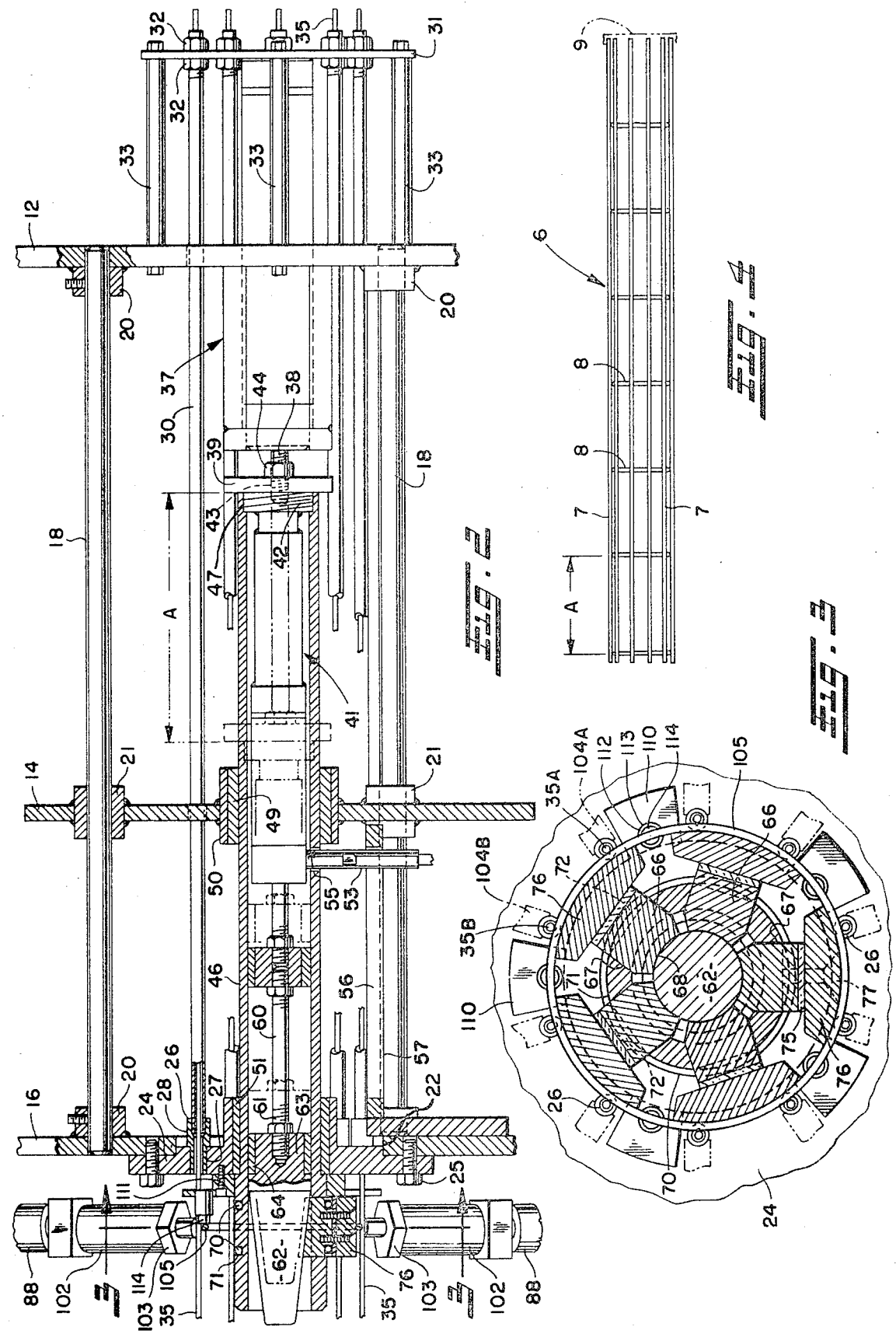

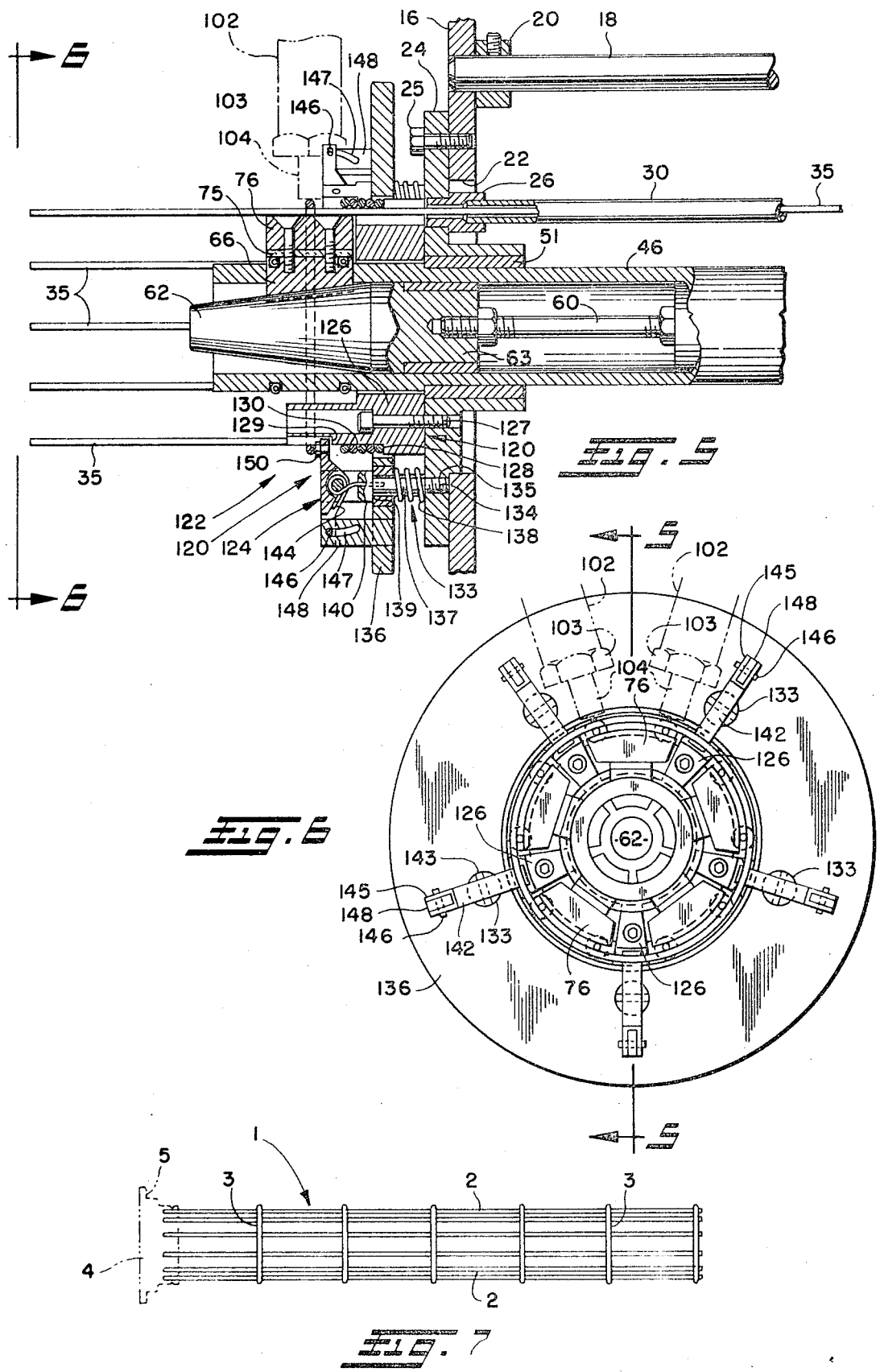

3,745,297

APPARATUS FOR MAKING A CAGE ASSEMBLY

The present invention as indicated relates to an apparatus for making a cage assembly having interconnected linear and endless wires.

Such cage assemblies find particular use as component elements in telescopic supports for bag filters or the like. Such telescopic supports generally include an inner cage assembly slidably telescoped within an outer cage assembly, the wires of the two cages being cooperatively configured to permit relative axial sliding of the assemblies for expansion and contraction of the support without relative rotation of such assemblies. Such cooperative configuration of the wires in the two assemblies requires that the cage assemblies be accurately manufactured for proper telescopic interfitting. An example of such a telescopic bag support is disclosed in our copending application Ser. No. 212,333, filed Dec. 27, 1971.

The principal object of the present invention is to provide an apparatus quickly and accurately to construct a cage assembly having a plurality of interconnected linear and endless wires. The required accuracy is obtained by means uniformly to advance the spot welded wires between endless wire application cycles and by means properly to position such endless wires with respect to the linear wires for spot welding.

It is another important object of the present invention to provide a basic apparatus for making cage assemblies that can readily be converted by slight modification to make assemblies having the endless wires connected to either the inside or outside diameter of the linear wires. By such conversion or by using two different apparatuses of similar characteristics, it is possible to construct inner and outer cage assemblies by using identical wire advancement and electrode structure with similarly functioning endless wire positioning supports, thereby to provide uniformity in manufacturing techniques of the component parts for improving accuracy between the relative wire configurations of the two cage assemblies.

It is still another important object of the present invention to provide oppositely positioned, radially movable inner and outer electrodes adapted both to clamp the endless wire to the array of linear wires and to spot weld the same for rigid interconnection.

It is yet another object of the present invention structurally and functionally to interrelate the indexing piston-cylinder assembly with the control piston-cylinder assembly for inner electrode movement. This object structurally is accomplished by axially aligning the two piston-cylinder assemblies with the indexing piston rod being connected to the control piston-cylinder assembly for reciprocation of the same.

Other objects and advantages of the present invention will become apparent as the following description proceeds.

To the accomplishment of the foregoing and related ends, the invention, then, comprises the features hereinafter fully described, the following description and the annexed drawings setting forth in detail a certain illustrative embodiment of the invention, this being indicative, however, of but one of the various ways in which the principles of the invention may be employed.

In said annexed drawings:

FIG. 1 is an end elevation of the present invention showing the inner and outer electrodes in spot welding position, with the linear wires and endless wire being clamped therebetween;

FIG. 2 is a vertical section taken substantially along line 2—2 of FIG. 1 having certain portions broken away for clarity of illustration and showing the cage indexing mechanism and the inner electrode radial camming mechanism;

FIG. 3 is a vertical end section taken along line 3—3 of FIG. 2 showing details of both the inner electrode assembly and the camming mechanism therefor;

FIG. 4 is an elevation showing in reduced scale the inner cage assembly of a telescoping bag filter support;

FIG. 5 is a fragmentary section similar to FIG. 2 taken along line 5—5 of FIG. 6 showing the apparatus of the present invention modified for application of endless wires to the outside diameter of the linear wire array;

FIG. 6 is an end view taken along line 5—5 of FIG. 5 showing the inner electrodes in radially extended clamping position, and, in phantom, two outer electrodes in extended, spot welding position; and FIG. 7 is an elevation in reduced scale showing the outer cage assembly of a bag filter support which telescopically receives the inner cage assembly illustrated in FIG. 4.

Referring now in detail to the drawings and initially to FIGS. 4 and 7, the apparatus of the present invention is adapted through slight modification to construct cage assemblies similar to those shown in either of such figures. The outer cage assembly 1 of FIG. 7 includes a plurality of linear wires 2 interconnected at equally spaced longitudinal intervals by a plurality of endless, substantially circular hoop wires 3. Such endless wires are spot welded to the outside diameter of the linear wires at each wire intersection to form a relatively rigid assembly. A thimble 4 is spot welded to one end of the assembly and provides an annular surface 5 by which the supports may be suspended from a tube sheet or the like.

The inner cage assembly 6 shown in FIG. 4 likewise includes a cylindrical array of linear wires 7 joined at equally spaced longitudinal intervals by substantially circular endless hoop wires 8. Such endless wires are spot welded to the inside diameter of such linear wires to form a relatively rigid assembly. A bottom plate 9 is connected to one end of such assembly to provide a planar surface about which the bottom of the bag filter may extend. The inner support is then telescopically received within the outer support in a manner described in our previously mentioned copending application Ser. No. 212,333, filed Dec. 27, 1971. Reference is specifically made to such copending application for the illustration and disclosure therein of the particular wire configurations of each cage assembly and interrelationship of the same in a bag filter environment.

APPARATUS AS MODIFIED TO MAKE THE INNER CAGE ASSEMBLY

The apparatus for making the inner cage assembly illustrated in FIG. 4 is shown in FIGS. 1-3 of the drawings. Referring initially to FIG. 2, a base for the apparatus (not shown) is mounted to a floor or other stable supporting surface. Three longitudinally spaced, vertical support members, namely, a back mounting plate 12, a bearing support 14, and a front mounting plate 16, are connected at their bottom ends to the base. Such support structures are otherwise interconnected and rigidified by three peripherally spaced tie shafts 18. Such shafts 18 are connected at their ends in inwardly turned tie support bosses 20 on the mounting plates 12 and 16 and extend through sleeves 21 in intermediate bearing support 14, such sleeves being axially aligned with such bosses.

The front mounting plate is provided with a circular opening 22 radially inside the tie support bosses. A front wire guide support plate 24 of L-shape cross section is mounted to the front mounting plate 16 by suitable fastening means 25. A plurality of wire guide bushings 26 are mounted in apertures 27 in the wire guide support plate, such apertures being arranged in a preselected array pattern such as the circular pattern shown in FIG. 3. Each wire guide bushing 26 has a cylindrical projection 28 extending behind the wire guide support plate. Each of such cylindrical projections receives the front end of an elongated wire guide tube 30 which extends through axially aligned apertures in both the bearing support and back mounting plates. The back end of each guide tube 30 is provided with a threaded portion extending through holes in back vertical guide support plate 31, such holes being arranged in an array complementary to the array of the wire guide bushings 26. Opposing nuts 32 are drawn against such back guide support plate axially to secure the guide tubes 30 in position. The back guide support plate 31 is supported in its vertical cantilevered position by a plurality of horizontal spacers 33 extending between and connected to the back mounting plate 12 and back guide support plate.

The linear wires 35 for the inner cage assembly are slidably received in the wire guide tubes 30. Such linear wires are of equal length and are initially slid into the guide tube until bottoming occurs or until adjustable stops (not shown) are engaged. In this manner, the linear wires extend a uniform distance forwardly of the front wire guide support plate 24 in parallel orientation within the preselected array configuration.

A first or indexing, double acting piston cylinder assembly, indicated generally at 37, is mounted in horizontal orientation to the back mounting plate 12. The indexing piston cylinder assembly has pneumatic supply lines (not shown) connected to both ends of the cylinder selectively to reciprocate the piston in the bore of the same. The forwardly extending piston rod 38 is provided with a threaded end portion extending through a vertically oriented annular pusher plate 39.

A second double acting piston cylinder assembly, indicated generally at 41, has a connection block 42 welded to the back of the same. Such connection block has a tapped central aperture 43 which threadably receives the end of piston rod 38 allowing such connection block to be drawn into flush contact with the front side of pusher plate 39. A nut 44 on piston rod 38 contacts the back side of the pusher plate axially to maintain the connection block and pusher plate in assembled abutting relationship.

A forwardly extending elongated welding cylinder 46 is connected at its back end to pusher plate 39, the inside diameter of such back end having a tapped annular notch 47 threadedly mating with the peripheral threads on connection block 42. The central portion of the welding cylinder 46 extends through bushing 49 positioned in a sleeve 50, such sleeve being received in and connected to intermediate bearing support plate 14. At its front end, the welding cylinder slides in bushing 51 received in the central aperture of the front wire guide support plate 24.

The second or control piston cylinder assembly 41 includes pneumatic supply lines to both ends of the cylinder selectively to reciprocate the piston in the bore of the same. A laterally extending hose connection stub 53, for such pneumatic lines, is threadedly mounted to the cylinder as shown at 54. The pneumatic lines are run through said stub and extend between a pressurized air supply or vent and the cylinder bore. The stub 53 extends through a hole 55 in the welding cylinder and an elongated aperture 56 in guide plate 57. The elongated aperture 56 permits the control piston cylinder assembly 41 inside welding cylinder 46 to reciprocate without interference from laterally extending connection stub 53.

The piston rod 60 of such second piston cylinder assembly 41 extends forwardly along the center line of the welding cylinder and has a terminal threaded portion 61. An arbor cam 62 in the form of a truncated cone is threaded onto terminal portion 61 of rod 60 and has a cylindrical rear extension 63 of slightly reduced diameter. Such reduced diameter section forms a shoulder for receiving an annular bushing 64, substantially equal in diameter to the inner diameter of welding cylinder 46, whereby such arbor may slide within the welding cylinder in uniform rectilinear movement relative to the inner diameter of the same.

Referring now to FIG. 3, five electrode holders 66, preferably of bronze material, extend radially outwardly through guide slots 67 in welding cylinder 46. The radially inner ends 68 of such electrode holders are circumferentially arcuately formed, as best shown in FIG. 3, and are also longitudinally inwardly tapered from right to left as best shown in FIG. 2, thereby permitting the holders cooperatively to mate with the lateral surface of conical arbor cam 62.

The electrode holders 66 are inwardly biased into continual surface contact with conical arbor cam 62 by two longitudinally spaced annular garter springs 70. Such springs are seated in transversely aligned arcuate notches 71 and 72 in the welding cylinder and the electrode holders, respectively, as best shown in FIG. 3. It will be appreciated that forward axial movement of arbor cam 62 forces each of the electrode holders 66 radially outwardly a uniform distance, with the garter spring stretching to accommodate such radial movement. When the arbor cam is returned, the garter springs will contract to maintain the electrode holders in contact with the surface of such cam to return such holders to their radially inner position.

The outer flat surfaces of the electrode holders have insulating blocks 75 superimposed thereupon, such blocks preferably being micarta or like insulating material. The inner electrodes 76, preferably of copper, are then secured to the outer faces of the insulating block by screws 77 passed through such blocks into the electrode holders, the heads of such screws being countersunk in the inner electrodes. As shown, the inner electrodes are in the form of segments having an arcuate outer surface, such surface being of sufficient peripheral extent to span two adjacent linear wires, for example 35A and 35B in FIG. 3.

As best shown in FIG. 1, the outer electrodes indicated generally at 80, are adapted radially to be reciprocated in unison by piston cylinder assemblies 81 mounted to the front face of front mounting plate 16.

Specifically, each such piston cylinder assembly is mounted by an L-shaped mounting bracket 82 secured to front plate 16 by bolts 83. Two laterally spaced support plates 84 are connected to each of the mounting flanges 85 of the brackets to strengthen and rigidify the cylinder backing flange 86 of such brackets.

The cylinder 88 of each piston cylinder assembly 81 is mounted on its respective backing flanges 86 by suitable fastening means such as the screw shank 89 carried by the radially outer end of the cylinder, such shank passing through a bore 90 in the backing flange with the end of the cylinder being drawn into abutment with such flange by the nut 91 and washer 92 illustrated.

Pneumatic supply lines (not shown) are connected to each end of the cylinder bore and are operative selectively and uniformly to reciprocate the pistons therewithin. The piston rods 93 extend radially inwardly from the cylinders and carry copper nuts 94 in their radial inner ends through which copper bolts 95 are threaded. Connectors 96 on electrical cables 97 are attached to the shank of copper bolts 95, the electrical cables extending to a transformer 99 operative to step down the voltage for spot welding.

The radially inner ends of copper bolts 95, pass through bores 100 in the connection flanges 101 of outer electrode holders 102. The radially inner ends of the outer electrode holders carry electrode adapters 103 which support electrodes 104, preferably of tipaloy material. It will be appreciated that the pistons of the piston cylinder assemblies are cycled radially inwardly to draw the electrodes into clamping and welding contact with the linear wires during spot welding as best shown in FIG. 1. In this respect, two adjacent outer electrodes are connected in series, for example electrodes 104A and 104B, so that the current flows from electrode 104A sequentially through linear wire 35A, the endless hoop wire 105, the inner electrode segment 76, the endless wire, the next adjacent linear wire 35B, and through electrode 104B to complete the circuit. After spot welding has been completed, the pistons are simultaneously cycled radially outwardly to withdraw the electrodes from such linear wires.

The assembly for positioning the endless wires relative to the linear wires varies depending upon whether such endless wires are to be spot welded to the inside or outside diameter of the linear wires. As shown in FIG. 3 the apparatus for making the inner cage assembly has five peripherally spaced ring segments 110 which are connected to wire guide support plate 24 by suitable fastening means such as countersunk bolts 111. Magnet supports 112 are mounted in apertures 113 in such ring segments with permanent magnets 114 being carried by the front faces of the supports. The endless wires are turned slightly from the vertical plane for insertion into the linear wires, such endless wires being inserted until seated on the magnets. In such position, the endless wires are accurately maintained in a plane normal to the linear wires.

OPERATION OF THE APPARATUS MODIFIED TO MAKE THE INNER CAGE ASSEMBLY

As discussed above, linear wires 35 are initially inserted in guide tubes 30 until such wires either bottom at the end of such tubes or engage suitable stops, thereby uniformly to expose equal linear wire lengths forwardly of the same. The first endless hoop wire 105 is then inserted into the array of linear wires and seated on the magnets of the positioning assembly. The piston of the control piston cylinder assembly 41 is then axially driven to the left to advance the arbor cam. Such advancement moves the tapered conical surface of cam 62 slidingly past the radially inner ends of electrode holders 66 to cam the same radially outwardly. The stroke of the control piston and the taper of the arbor cam are preselected to control the radial movement of the electrode holders so that the inner electrodes are just brought into clamping contact with the endless wire.

Simultaneously, piston cylinder assemblies 81 for the outer electrodes are activated to drive the pistons thereof radially inwardly resulting in similar radial movement for electrodes 104. The stroke of such pistons corresponds to the distance between the retracted outer electrode and the linear wires whereby actuation of such piston just results in said electrodes clampingly engaging the linear wires 35. The opposed clamping relationship of the inner and outer electrodes and the magnet positioning apparatus accurately hold the linear wires and endless wire in position during spot welding. After the weld has been formed as described above, the outer electrodes are withdrawn radially outwardly by returning the pistons of piston cylinder assembly 81 to their retracted positions.

The piston of indexing piston cylinder assembly 37 is then advanced to the left to extend piston rod 43, while the control piston is still extended to maintain inner electrodes 76 in clamping position against the spot welded wires. The extension of the indexing piston cylinder assembly thus results in advancing the clampingly held spot welded wires the stroke distance of such indexing piston cylinder assembly, such stroke distance corresponding to the distance A between the endless hoop wires of the cage assembly. The control piston is then retracted to draw the arbor cam axially to the right as seen in FIG. 2. This retraction results in the inner ends of the electrode holders following the radially inward taper of the conical arbor cam resulting in radially inward movement caused by natural contraction of expanded garter springs 70. The indexing piston is then likewise retracted to draw the second piston cylinder assembly and arbor cam axially to the right to the retracted or home position shown in FIG. 2, without moving the spot welded wires. With both such piston cylinder assemblies retracted, the next endless wire is inserted into the rectilinear wire array and the same spot welding cycle is repeated until the cage assembly is completed.

APPARATUS AS MODIFIED TO MAKE THE OUTER CAGE ASSEMBLY

The outer cage assembly of the telescoping bag filter support has the endless hoop wires spot welded to the outside diameter of the linear wires. As such, the remaining endless wires must be stored behind the endless wire being applied in order to be subsequently properly positioned with respect to the linear wires and inner and outer electrodes. The required positioning behind the electrodes is occasioned, of course, by the physical impossibility of slipping subsequent dimensionally stable endless hoop wires past an endless wire of the same diameter that has already been spot welded to the linear wires.

Referring now to FIGS. 5 and 6, the structural elements of the second apparatus have been indicated by like reference numerals. It will be noted that the indexing assembly, camming assembly, and electrode structure are identical for each apparatus, whereby assembly construction steps on both cages are essentially identical resulting in cage assembly uniformity. The basic difference between the two apparatuses is the assembly for positioning the endless hoop wires.

In this respect, the endless wire positioning apparatus indicated generally at 120 includes a wire magazine 122 and a wire retention and feed mechanism 124. The wire magazine includes a plurality of peripherally spaced blocks 126 (see FIG. 6) which are attached to wire guide support plate 24 by suitable fastening means 127. The radially outer face of each block 126 is inwardly stepped twice to form shoulders 128 and 129. The peripheral spacing of the blocks is selected to interdigitate the blocks with the inner electrode members as best shown in FIG. 6. Shoulders 128 and peripheral faces 130 extending forwardly therefrom on the blocks provide a seat for the number of endless wires needed for the outer cage being assembled.

The wire retention and feed mechanism 124 is mounted to the wire guide support plate 24 by five peripherally spaced, horizontally oriented pins 133, each of such pins having three distinct shank portions of increasing diameter from right to left as seen in FIG. 5. The smallest diameter shank portions 134 of the pins are threadably received in a tapped aperture 135 in wire guide support plate 24 to secure such shafts and the retention and feed mechanism to the apparatus. An annular actuating ring 136, having apertures geometrically coinciding with and the same diameter as the intermediate shank portions 137 of pins 133, is vertically positioned in front of the wire guide support plate by sliding the same onto such intermediate shank portions 137 before connecting the pins to such plate. The actuating ring is biased by springs 138 against shoulders 139 formed by the largest shank portions 140, such springs being interposed between the actuating ring and the wire guide support plate on each intermediate shank portion.

Levers 142 are pivoted at 143 to the front ends of large shank portions 140 of pins 133. The levers are biased in a clockwise direction by springs 144 to maintain such levers in a position closely adjacent to or seated on shoulders 129 of blocks 126. Such normal position of the levers precludes the endless rings stored in front of shoulders 128 from slipping past such levers into spot welding position. The radially outer end of each lever terminates in clevis 145 across the legs of which guide pin 146 extends. Such pins 146 are received in elongated arcuate slots 147 in each of five peripherally spaced guide blocks 148, such guide blocks extending forwardly from actuating ring 136. In the retention position of the levers illustrated in FIG. 5, the pins are at the left end of the elongated slot. The inner ends of the levers are provided with permanent magnets 150, such magnets releasably holding the endless wires in a plane normal to the linear wire array.

To set up the wire positioning apparatus for operation, the operator depresses actuating ring 136 against the bias of springs 133, such movement resulting in counter-clockwise movement of the levers through the arcuate slot and pin interconnection. The endless hoop wires may then be slid into seated position on annular peripheral faces 130 of the wire magazine. Each individual endless hoop wire may then be properly positioned on magnets 150 either by similar actuation of ring 136 for hoop withdrawal or by grasping the endless wire and axially drawing the same to the left to pivot the levers in a counterclockwise direction as allowed by the pin and slot connection. Once the endless wire clears the levers, springs 144 return such levers to the home position and the wire may then be positioned on such magnets in a plane normal to the linear wires.

OPERATION OF THE APPARATUS AS MODIFIED TO MAKE THE OUTER CAGE ASSEMBLY

The operational sequence for the second apparatus is the same as the operational sequence for the first apparatus except for the positioning of the endless wires. Initially, the linear wires are inserted into the guide tubes until either bottoming therewithin or engagement with suitable stops to leave equal exposed portions of such wires. The endless tube wires required for the outer cage assembly of the telescoping bag filter support are then positioned on the annular seat 130 by depression of the actuating ring. The actuating ring is then again depressed by the operator and the first endless wire drawn past the pivotally withdrawn inner ends of the levers. The actuating ring is then released and returns under spring bias to its position against shoulders 139 allowing springs 144 to return the levers to their home position. The endless wire is then slid back along the linear wires until seated against the magnets in a position perpendicular to the linear wires.

Alternatively, after the endless wires have been positioned on seat 130, the first endless wire may be axially moved to the left by the operator to engage and pivot levers 142. Such pivoting of the levers is permitted by movement of pins 146 in arcuate slots 147, and, once the endless hoop has cleared such levers, the latter return to their home position under the bias of springs 144.

In either event, the control piston cylinder assembly 41 is then actuated radially outwardly to cam the inner electrode holders 66 to draw the inner electrodes 76 into clamping position against the linear wires. Simultaneously, the outer electrode piston cylinder assemblies are actuated radially inwardly to drive such electrodes into clamping relationship with the endless hoop wires. The electrodes are then electrically energized to spot weld the endless wire to the linear wires. After the spot welding is completed, the indexing piston cylinder assembly is actuated to advance the interconnected linear and endless wires the stroke distance corresponding to the distances between adjacent hoop wires on the outer assembly. The control piston cylinder assembly is then retracted radially inwardly to withdraw the inner electrodes. The indexing piston cylinder assembly is then retracted to return the inner electrodes to their retracted positions without cage assembly movement. The operational sequence is then repeated by positioning the next endless wire against the magnets for spot welding in the manner described.

Although cylindrical cage assemblies have been described, it will be obvious that cage assemblies of other configurations could be made with only slight modifications of the structure disclosed. Specifically, the wire guide tubes could be disposed in a rectangular array or other similar positioning of the linear wires and rectangular endless wires could be applied to the same by spot welding.

The embodiments of the invention in which an exclusive property or privilege is claimed are defined as follows:

1. An apparatus for making a cage assembly having interconnected linear and endless wires, such apparatus comprising guide means for said linear wires establishing an array of the same complimentary to the configuration of the endless wires, said linear wires being exposed at one end of said guide means, support means properly for positioning one of said endless wires relative to the exposed portions of said linear wires, electrodes positioned radially inwardly and outwardly of the endless wire and linear wire intersections to interconnect the same by spot welding, and indexing means cyclicly for advancing said interconnected endless and linear wires a preselected distance for similar application of another endless wire until the cage assembly is completed.

2. The apparatus of claim 1 wherein the electrodes are radially movable and selectively oppositely biased so as to provide compressive pressure at such intersections.

3. The apparatus of claim 1 wherein the inner electrodes are cammed outwardly into contact with one of the wires at each such intersection by a control piston cylinder assembly.

4. The apparatus of claim 3 wherein said control piston cylinder assembly is axially oriented and terminates in a conical cam surface mating with the inner ends of a plurality of radially oriented, inwardly biased electrode holders, whereby axial reciprocation of said first piston results in radial reciprocation of said electrode holders.

5. The apparatus of claim 4 wherein said electrodes are mounted on the outer ends of said electrode holders and the taper of the conical surface and stroke length of the control piston are correlated outwardly to cam said electrodes into contact with at least one of said wires when said control piston cylinder assembly is extended.

6. The apparatus of claim 3 wherein said indexing means includes an indexing piston cylinder assembly having a piston rod terminating in a pusher plate which carries a welding cylinder in which said control piston cylinder assembly concentrically is housed.

7. The apparatus of claim 6 wherein said one endless wire is positioned on said support means with both piston cylinder assemblies retracted, said control piston cylinder assembly then being extended to cam the inner electrodes into contact with each such intersection while said outer electrodes are inwardly urged into oppositely disposed contact with each such intersection, thereby clampingly to hold the wires together.

8. The apparatus of claim 7 wherein the inner electrodes are each of segmental configuration to span two adjacent linear wires for completing the electrical welding circuit between adjacent outer electrodes which are electrically joined in series.

9. The apparatus of claim 8 wherein, after indexing advancement, said control piston is retracted radially inwardly to withdraw said inner electrodes and said indexing piston is then retracted axially to return said control piston cylinder assembly to home position without wire movement for subsequent positioning on the support means of another endless wire to be welded to the array of linear wires.

10. The apparatus of claim 7 wherein said linear and endless wires while being clampingly held are spot welded by said inner and outer electrodes, said outer electrodes then being radially withdrawn and said indexing piston extended to advance said first piston cylinder assembly, said inner contacting electrodes, and the welded linear and endless wires a predetermined distance.

11. The apparatus of claim 1 wherein the support means comprises a plurality of peripherally spaced magnets positioned radially inside said linear wires in a plane normal to the same.

12. The apparatus of claim 1 wherein the support means comprises a plurality of peripherally spaced magnets positioned radially outside said linear wires in a plane normal to the same.

13. An apparatus for making a cage assembly having interconnected linear and endless wires, such apparatus comprising guide means for said linear wires establishing an array of the same complimentary to the configuration of the endless wires, support means properly for positioning one of said endless wires relative to said linear wires, inner and outer adjustable electrodes selectively radially positioned to clamp the endless wire to the linear wires at points of intersection to interconnect the same by spot welding, and indexing means cyclicly for advancing said interconnected endless and linear wires a preselected distance for similar application of another endless wire until the cage assembly is completed, the inner electrodes remaining in clamping position during advancement drivingly to interconnect the cage assembly with said indexing means.

14. The apparatus of claim 13 wherein the inner electrodes are cammed outwardly into contact with one of the wires at each such intersection by a control piston cylinder assembly.

15. The apparatus of claim 14 wherein said control piston cylinder assembly is axially oriented and terminates in a conical cam surface mating with the inner ends of a plurality of radially oriented, inwardly biased electrode holders, whereby axial reciprocation of said first piston results in radial reciprocation of said electrode holders.

* * * * *